United States Patent
Falcade, Jr.

(10) Patent No.: US 12,217,220 B2
(45) Date of Patent: Feb. 4, 2025

(54) METHOD FOR MANAGING HEALTH SERVICE SOLID WASTE

(71) Applicant: BUMERANGUE COMERCIO E SERVICOS DE TECNOLOGIAS AMBIENTAIS LTDA, Porto Alegre (BR)

(72) Inventor: Arildo Falcade, Jr., Porto Alegre (BR)

(73) Assignee: BUMERANGUE COMERCIO E SERVICOS DE TECNOLOGIAS AMBIENTAIS LTDA, Porto Alegre (BR)

( * ) Notice: Subject to any disclaimer, the term of this patent is extended or adjusted under 35 U.S.C. 154(b) by 500 days.

(21) Appl. No.: 17/281,106

(22) PCT Filed: Sep. 13, 2019

(86) PCT No.: PCT/BR2019/050395
§ 371 (c)(1),
(2) Date: Mar. 29, 2021

(87) PCT Pub. No.: WO2020/061665
PCT Pub. Date: Apr. 2, 2020

(65) Prior Publication Data
US 2021/0342794 A1 Nov. 4, 2021

(30) Foreign Application Priority Data
Sep. 27, 2018 (BR) .................. 102018069768-4

(51) Int. Cl.
G06Q 10/30 (2023.01)
(52) U.S. Cl.
CPC .................. *G06Q 10/30* (2013.01)

(58) Field of Classification Search
None
See application file for complete search history.

(56) References Cited

U.S. PATENT DOCUMENTS

| | | | |
|---|---|---|---|
| 4,439,209 A | 3/1984 | Wilwerding et al. | |
| 2006/0036407 A1* | 2/2006 | Smith | G16H 70/40 702/188 |

(Continued)

FOREIGN PATENT DOCUMENTS

| | | | |
|---|---|---|---|
| CN | 103480636 A | * | 1/2014 |
| EP | 0765928 A2 | | 4/1997 |

(Continued)

OTHER PUBLICATIONS

English translation of IPRP issued in corresponding International application No. PCT/BR2019/050396 on Apr. 8, 2021 (4 pages).

(Continued)

*Primary Examiner* — Jan P Mincarelli
(74) *Attorney, Agent, or Firm* — BACON&THOMAS,PLLC (57) ABSTRACT

A method is described for managing health service solid waste, in which the solid waste from the generating unit is collected, sorted, transformed and packaged at a Central Waste Transformation Facility (CTR) within the generating unit which conveys the sorted waste to a processing unit that sends back to the generating unit, in return, transformed products, inputs and/or energy for use in routine activities, conferring a commercial value on waste that is customarily sent to landfill.

9 Claims, 6 Drawing Sheets

(56) References Cited

U.S. PATENT DOCUMENTS

| | | | |
|---|---|---|---|
| 2011/0071230 A1* | 3/2011 | Ji | A61L 11/00 |
| | | | 705/308 |
| 2012/0217442 A1 | 8/2012 | Jeney | |
| 2013/0036746 A1 | 2/2013 | Graham | |
| 2018/0051877 A1* | 2/2018 | Liss | F23G 5/0276 |
| 2020/0182801 A1* | 6/2020 | Fang | F21V 7/0025 |

FOREIGN PATENT DOCUMENTS

| | | | | |
|---|---|---|---|---|
| IT | UA20163609 A1 | 11/2017 | | |
| WO | WO-2008129267 A2 | 10/2008 | | |
| WO | WO-2015085388 A1 * | 6/2015 | | F23G 5/0276 |

OTHER PUBLICATIONS

English Translation of Written Opinion of the Internationation Searching Authority issued in corresponding International application No. PCT/BR2019/050396 dated Feb. 2, 2021 (4 pages).

International Search Report (with English translation) issued in corresponding International application No. PCT/BR2019/050396 mailed Nov. 14, 2019 (7 pages).

\* cited by examiner

METHOD FOR MANAGING HEALTH SERVICE SOLID WASTE

FIELD OF THE INVENTION

The present invention patent describes a method for the management of solid waste from healthcare services in which recyclable solid waste is segregated internally or externally at the generating unit and destined for processing units to be transformed into products, inputs and energy that are returned to the generating unit to be used in routine activities, conferring commercial value to waste that would conventionally be sent to landfills or other destinations.

BACKGROUND OF THE INVENTION

Garbage is basically any and all solid waste from human activities. However, the most current concept is that garbage is that which nobody wants or does not have commercial value (BIDONE, F. R. A.; POVINELLI, J. Conceitos Basicos de Residuos Sólidos. São Carlos: EESS/USP, 1999. 120 p.).

In this sense, waste recycling appears as an important option for solid waste management. The biggest challenge for recycling is waste separation. The lack of information on the subject is one of the main reasons for the absence of well-supported projects that lead to improvements in the sector. Particularly, waste from healthcare services deserves special attention in the steps of separation, packaging, storage, collection, transportation, treatment and final disposal, due to the serious and immediate risks posed by them, particularly regarding the infectious-contagious issue. (NAIME, Roberto, et al. Uma abordagem sobre a gestão de residuos de serviços de saúde. Revista Espaço para a Saúde, Londrina, v. 5, n. 2, p. 17-27, June 2004).

An efficient program for the management of waste generated in healthcare establishments aims to improve public health conditions, through the protection of the environment. With effective management, it is possible to establish, at each step of the system, generation, segregation, packaging, collection, transport, storage, treatment and final disposal of waste, safely handling the waste with the use of appropriate equipment by the professionals involved, including regarding the use of Personal Protective Equipment (PPE), which are indispensable in this case. The adoption of prior separation and disinfection mechanisms allows the recycling of glass, organics, metals, aluminum, plastics, paper and others. The main causes for the progressive growth in the rate of generation of solid waste from healthcare services is the continuous increase in the complexity of care and the increasing use of disposable materials (SANCHES, P. S. Caracterização dos Riscos nos Residuos de Serviços Saúde e na Comunidade. In: Gerenciamento de Residuos Sólidos de Serviços de Saúde . São Paulo: CETESB, 1995. p. 33-46.).

According to Petranovich (PETRANOVICH, J. Minimization of environmental effects from medical waste. Packaging of Health-care Devices and Products, 1991) the volume of waste from healthcare services has grown 3% per year, a phenomenon fueled by the growth in the use of disposables that has increased from 5% to 8% per year.

In general, waste from healthcare services is not yet given a proper differentiated treatment, often having as final destination the same place used for the disposal of other urban waste (BRILHANTE, O. M; CALDAS, L. A. Gestão e avaliação de risco em saúde ambiental. Rio de Janeiro: Fiocruz, 1999. 155 p.). It is noteworthy that in most of these places, access is free to scavengers who practice informal recycling, increasing the likelihood of contraction of infectious diseases by the people exposed to manipulation of areas contaminated by this waste. (BIDONE, F. R. A.; POVINELLI, J. Conceitos Básicos de Residuos Saúde . São Carlos: EESS/USP, 1999. 120 p.).

The biggest problem of solid waste from healthcare services is its risk potential. Risk is defined as a measure of the probability and severity of the adverse effects from a particular action.

The "United States Environmental Protection Agency" (U.S. ENVIRONMENTAL PROTECTION AGENCY (USEPA). Guide for infectious. Waste Management Report. Washington, 1986.) defines hazardous waste as "solid waste or a combination of solid waste, which due to its quantity, concentration, physical, chemical or infectious characteristics, can cause or contribute significantly to an increase in mortality or an increase in severe irreversible diseases or temporary disability, representing a real and potential risk to human health and the environment, when improperly treated, stored, transported, disposed of or handled". Health care waste is considered hazardous under both the US and Brazilian law. Hazardousness is attributed due to both toxicity and pathogenicity.

Studies by Machado et al. (MACHADO, V. M. P.; AMBRÔSIO, R. A.; MORENO, J. Diagnóstico dos Residuos dos Serviços de Saúde no Municipio de Botucatu, Proposta de Segregação In: SEMINÁRIO INTERNACIONAL DE RESIDUOS SÓLIDOS HOSPITALARES, 1993, Cascavel. Anais . . . Cascavel, PR: 1993. p. 91-108.) identified a series of microorganisms present in the waste mass, indicating their risk potential. Microorganisms such as *Salmonella thyphi, Pseudomonas* sp., *Streptococcus aureus* and *Candida albicans* were indicated. The possibility of a virus surviving in the mass was proven for polio type I, hepatitis A and B, influenza and enteric viruses. Studies carried out by the same author revealed pathogens in viable conditions for up to 21 weeks during the process of decomposition of organic material. In these studies, it was identified the development of mesophilic bacteria (65,450,000/kg waste), sporulated (2,211,000/kg), thermophilic (8,427,000/kg), fungi (500,000/kg) and helminths (428 eggs/kg).

According to the World Health Organization (WHO), solid waste from healthcare services includes all waste generated by healthcare facilities, research centers and laboratories. For the National Health Surveillance Agency (ANVISA) (ANVISA. Manual de gerenciamento de residuos de serviços de Saúde—série A. Normas e Manuais Técnicos: Brasilia, DF. 2006), they are those that originate from any human or animal medical-assistance activity, pharmacology and health, expired medicines, morgues, funeral homes, forensic medicine and sanitary barriers. Since such waste is heterogeneous, appropriate classification for the waste generated in a health establishment allows a more efficient, economical and safe handling, according to the Pan American Health Organization (PAHO) (1997).

Solid health-care waste (SHW) can be classified into infectious waste—culture, expired vaccine, blood and blood products, tissues, materials resulting from surgery, needles, contaminated animals, waste that came into contact with patients (secretions, meals, etc.); special waste—radioactive waste, expired, contaminated, forbidden medicine, hazardous chemical waste; and common waste—did not come into contact with patients (office supplies, food scraps, etc.)

Currently, according to the national legislation, which assigns full responsibility for the collection, treatment and disposal of waste to the generator, segregation activities are a reality in healthcare facilities, although hampered by the need to change habits and behavior, in addition to the need to train the technical staff. However, a large part of the process involving some action related to waste is carried out by outsourced companies, making it difficult to monitor the provided services, as well as the dependence on factors external to the generating units, such as the places available for the disposal of waste and its conditions, which sometimes prove to be inadequate.

Therefore, the technical literature describes the management of healthcare waste being carried out externally to the generating unit, due to its complexity and dissociation with the primary activities and, if performed internally, electrothermal deactivation, autoclaving, disposal in special cells or incineration are commonly applied practices, in the case of chemical waste, without any segregation action being taken so that the waste can be processed in order to provide a product that can be used in the generating unit. Thus, the generating units incur a high-cost in hiring third parties who remove, treat and dispose of waste in landfills or through incineration, increasing the environmental liability and, often, making use of the public selective collection service, which is a burden for the public treasury.

Thus, the object of the present patent of invention is a method of management of waste from healthcare services whose activities of segregation, collection and destination to processing units or landfills or other forms of waste treatment are carried out internally or externally, at a Waste Transformation Plant in the generating unit, by means of a controlled system, in order to obtain useful indicators for planning and minimizing waste generation, in addition to making it possible to transform infectious waste into common waste and common waste into recyclable waste, and recyclable waste into raw material, thus returning to the generating unit transformed products that were processed internally or by processing units (or suppliers) in exchange for the waste destined to this processing unit.

TABLE OF CONTENTS

The invention describes a method for the management of waste from healthcare services that segregates recyclable waste internally, thus avoiding cross-contamination with infectious waste, through practices that make it possible to transform infections waste into common waste and common waste into recyclable waste.

The invention describes a method of management of waste from healthcare services that allows planning the collection routine, the planning of intermediate storage spaces and the practices to minimize waste production.

The invention describes a method for the management of waste from healthcare services that allows obtaining data on the amount of waste generated and the category of this waste, The invention describes a method for the management of waste from healthcare services that allows obtaining indicators of collection, productivity, efficiency, non-conformities, among others.

The invention describes a method for the management of waste from healthcare services that allows the inclusion of ecological credits in situations in which energy is harnessed from waste, thus eliminating the need to dispose waste in landfills and ensuring return in fuel gas and/or electricity proportional to the production from the generating unit.

The invention describes a method for the management of healthcare service waste in which the generating units treat the waste internally or externally, drastically reducing the financial impact from the destination of the waste and the environmental liability.

The invention describes a method for the management of waste from healthcare services in which the generating units have direct processes, with properly licensed processing units that return inputs to the generating unit, avoiding the consumption of raw material that would be extracted from the environment.

DETAILED DESCRIPTION OF THE INVENTION

For the purposes of this invention, the following terms are defined:

Generating unit—a unit that generates waste due to its work processes.

Processing unit—a unit external to the generating unit that transforms the segregated waste into a product.

Transformed products—products obtained from the processing of solid waste.

The method for the management of healthcare service waste, object of the present invention patent, comprises the mapping of the physical structure of the generating unit, in order to identify the waste generation areas and the classification of such waste (infective and non-infective, Class I, Class IIA, Class MB), the volume of waste generated and the respective treatment, with the definition of a set of steps that involve the definition of the collection sites, the positioning of the containers, the collection routines, the segregation of waste in a Waste Transformation Plant (WTP), the storage of packaged and classified waste and the destination to processing units or landfills, in accordance with the legislation.

Figure 1:
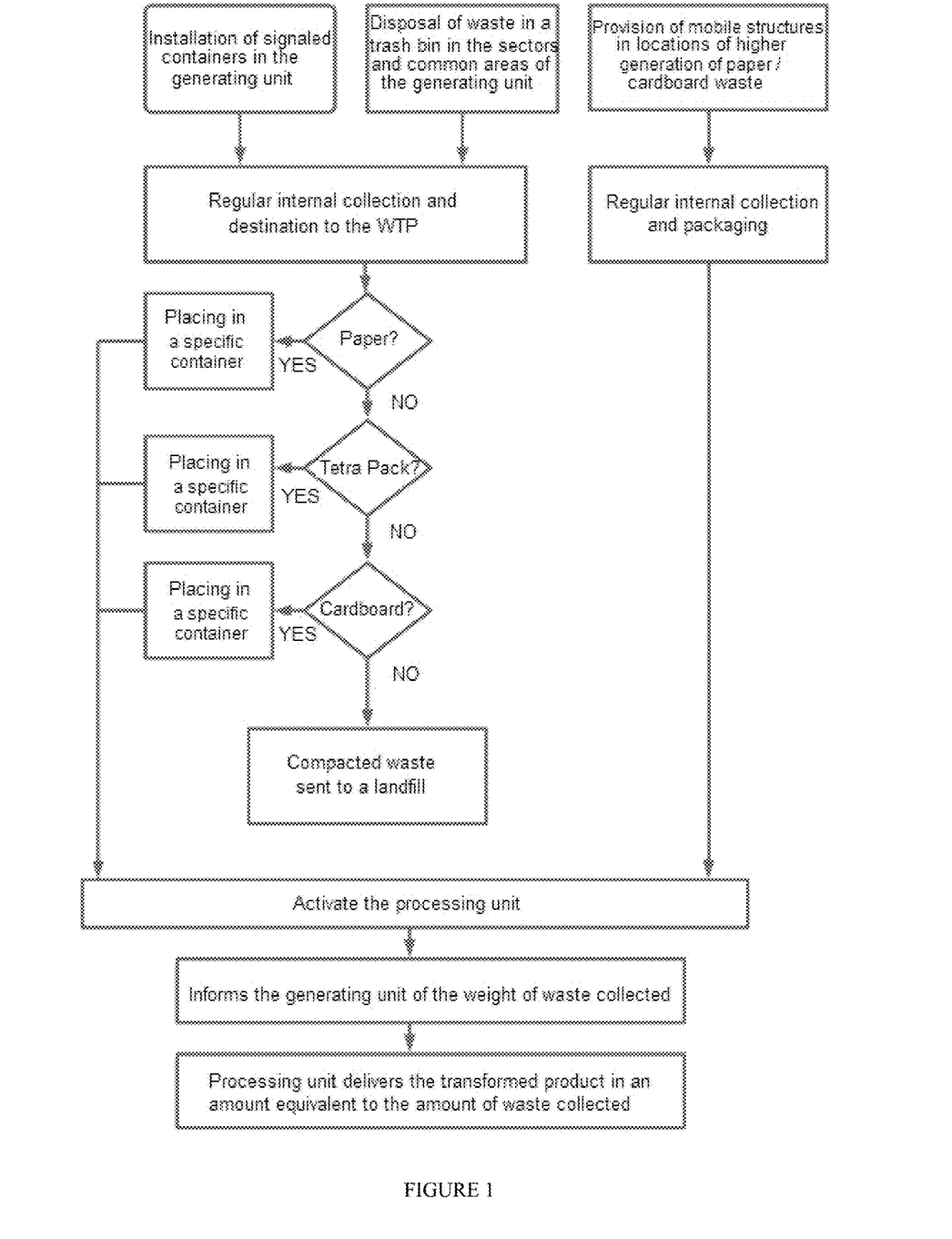
FIG. 1 shows a flowchart of the paper and cardboard management method in the generating unit.

As shown in FIG. 1, for the collection of paper and cardboard waste, duly signposted containers are placed in different areas of the generating unit for the specific collection of this waste, which is regularly collected and sent to WTP.

At the WTP, waste from the containers is segregated into categories, such as white paper, cardboard and tetrapack, which are packaged in specific packages and sent to the WTP shipping sector to be made available to the processing unit.

The processing unit informs the generating unit of the amount of waste collected and returns to the unit of origin an equivalent amount of transformed product (such as toilet paper, paper towels, brown paper, packaging, among others).

Paper and cardboard waste that were not categorized in the segregation stage are considered rejected waste and forwarded to a compactor to be sent to a landfill.

In the places with the highest generation of paper and cardboard waste, mobile structures are arranged, being collected regularly to be placed in larger capacity containers that are regularly collected by the supplier and replaced by an empty container.

Figure 2:
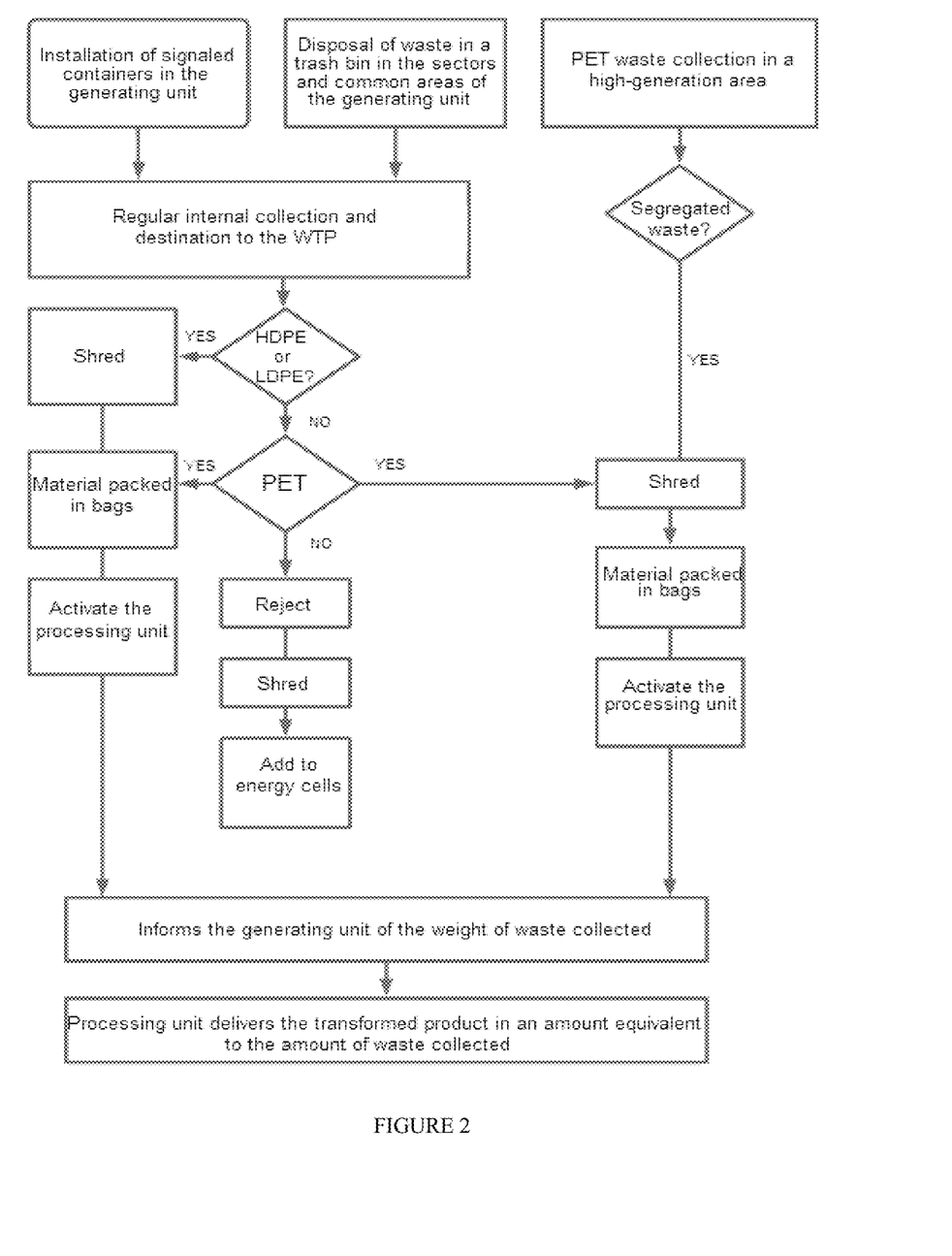
FIG. 2 shows a flowchart of the plastics management method in the generating unit.

As shown in FIG. 2, the plastics discarded in containers arranged in different areas of the generating unit are sent to the WTP where they are segregated into categories, such as polyethylene group, PET group (poly(ethylene-terephthalate)), being then crushed and packaged for shipment to a processing unit. The effective reduction of the environmental impact under such a system is noteworthy, since the volume of waste is greatly reduced during crushing.

The processing unit informs the generating unit of the amount of plastic waste collected and returns to the unit of origin an equivalent amount of transformed product (such as plastic packaging, garbage bags, plastic bags, brooms, fabrics and clothing, among others).

Plastics categorized as unusable or economically unfeasible are crushed and sintered to obtain an energy cell and subsequently thermally transformed to decompose their molecules and produce fuel gas with several uses as an energy source.

Figure 3:
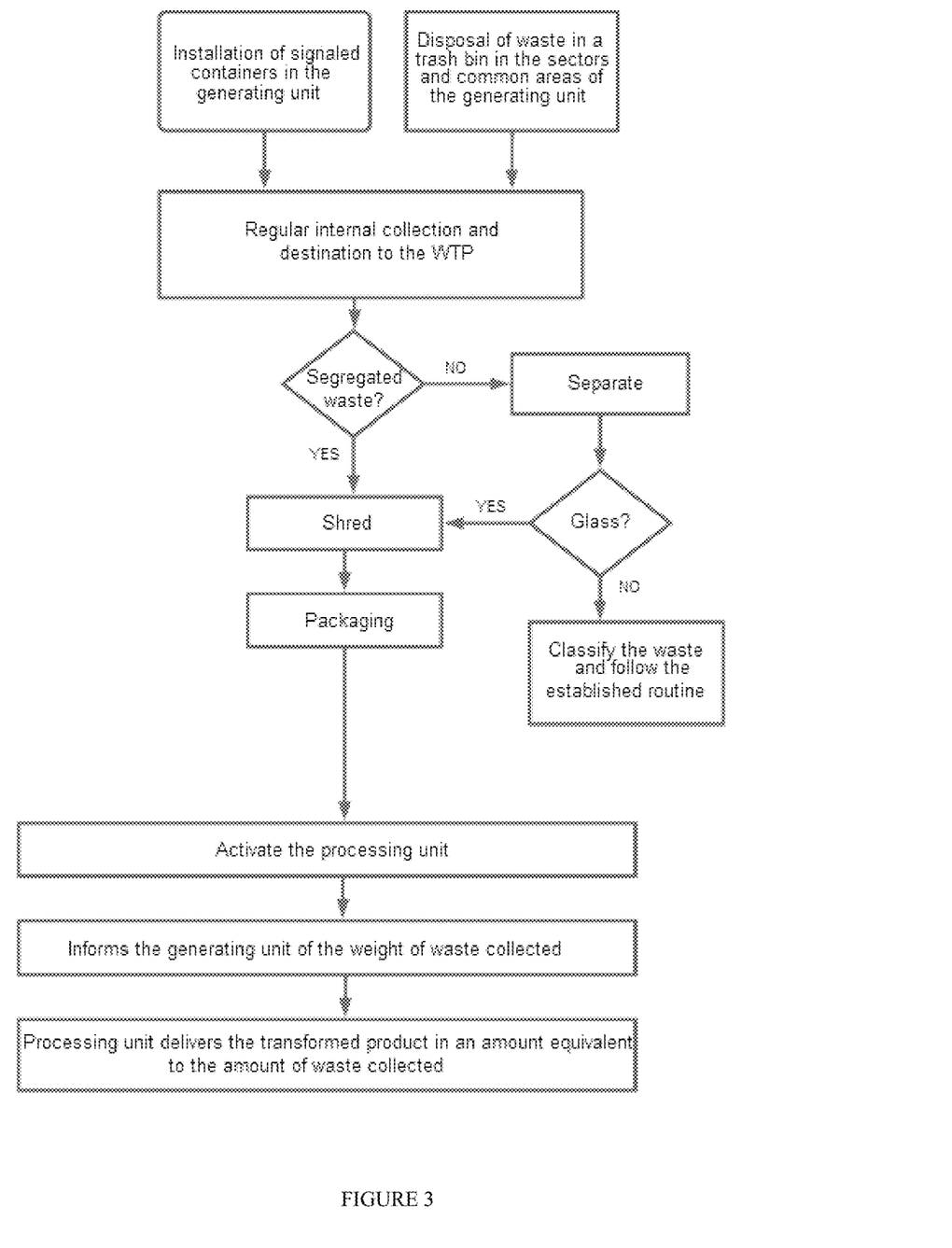
FIG. 3 shows a flowchart of the glass management method in the generating unit.

As shown in FIG. 3, the glasses discarded in containers arranged in different areas of the generating unit are sent to the WTP where they are separated, crushed and packed to be later sent to the processing unit for transformation into glass products that return to the originating unit.

Figure 4:
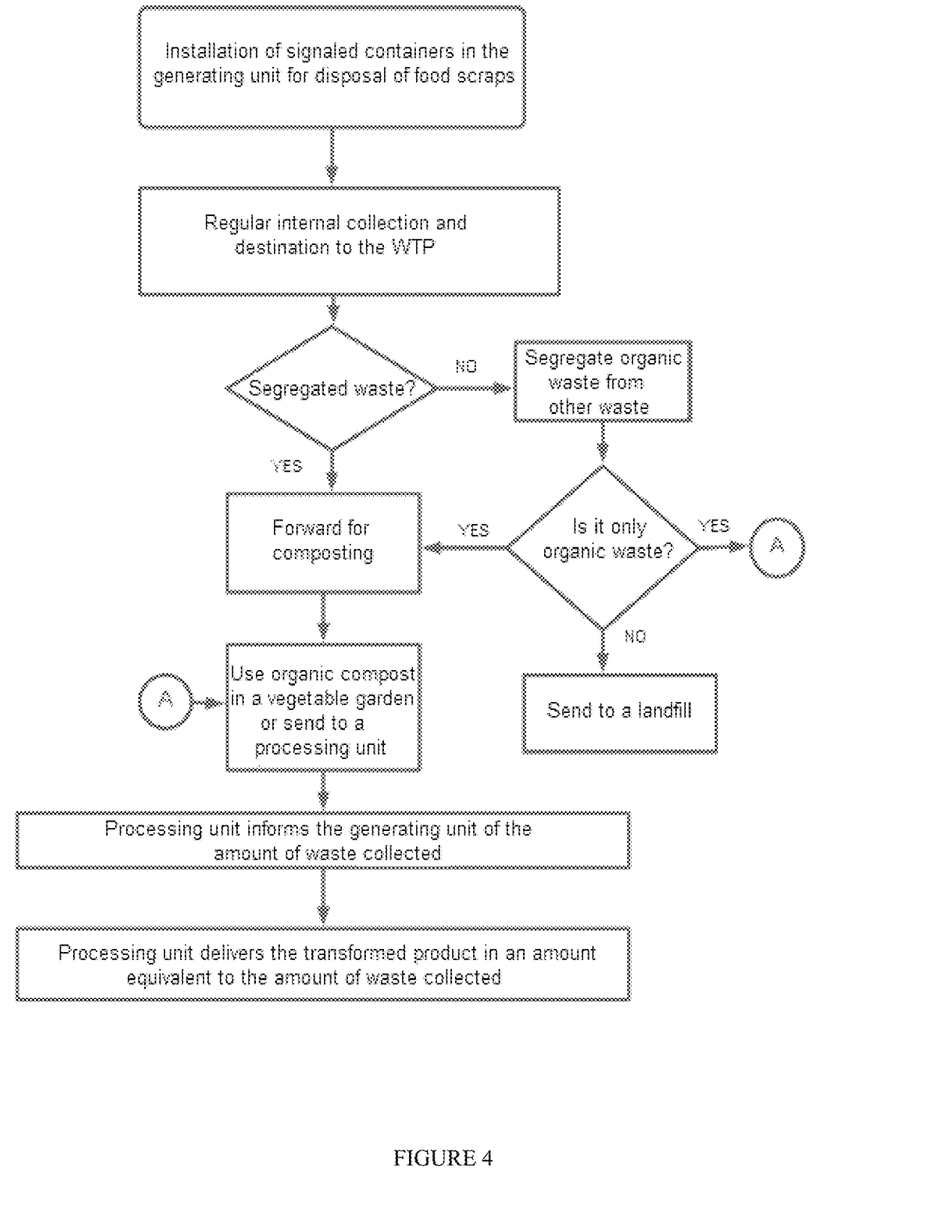
FIG. 4 shows a flowchart of the organic waste management method in the generating unit.

Organic waste from food scraps and food production is discarded in containers and sent to the WTP in order to undergo accelerated composting for transformation into humic substances by the action of microorganisms. The resulting product can be used by the generating unit itself or sent to a processing unit.

The processing unit informs the generating unit of the amount of organic waste collected and returns an equivalent amount of processed product to the unit of origin, which may be. in this case, horticultural products.

At the WTP, organic waste is screened for the removal of any plastic packaging that, if possible, is removed and receives the treatment procedures applied to plastics. If the plastic packaging is not removed from the organic waste, the waste is classified as common waste and packaged in a suitable packaging to be sent to a landfill.

Figure 5:
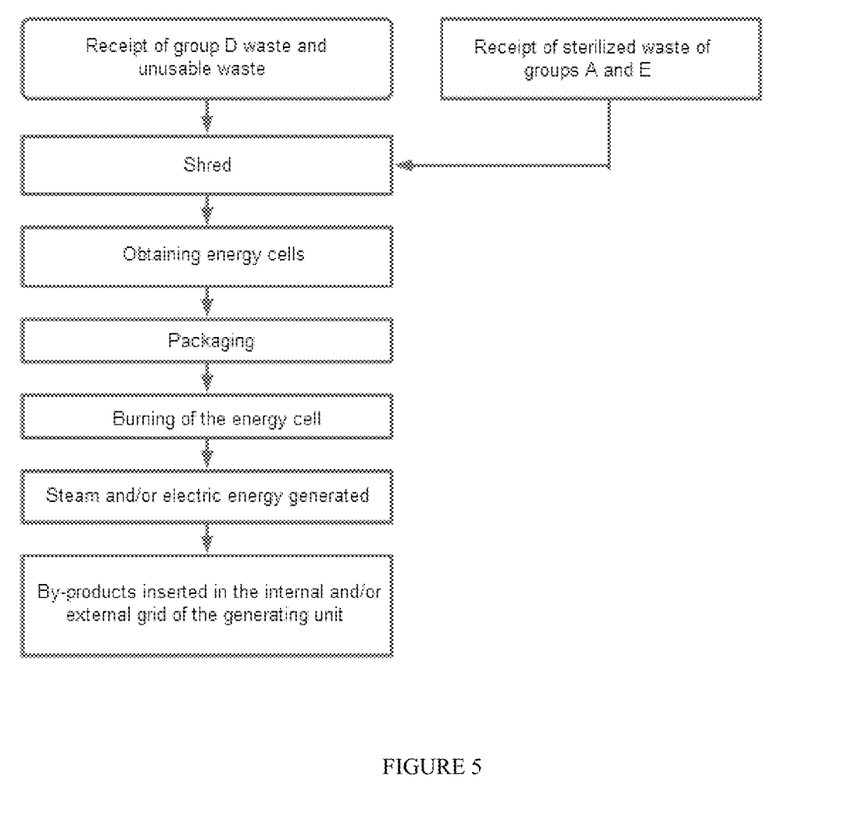
FIG. 5 shows a flowchart of the method for managing biological and plastic waste in the generating unit.
Figure 6:
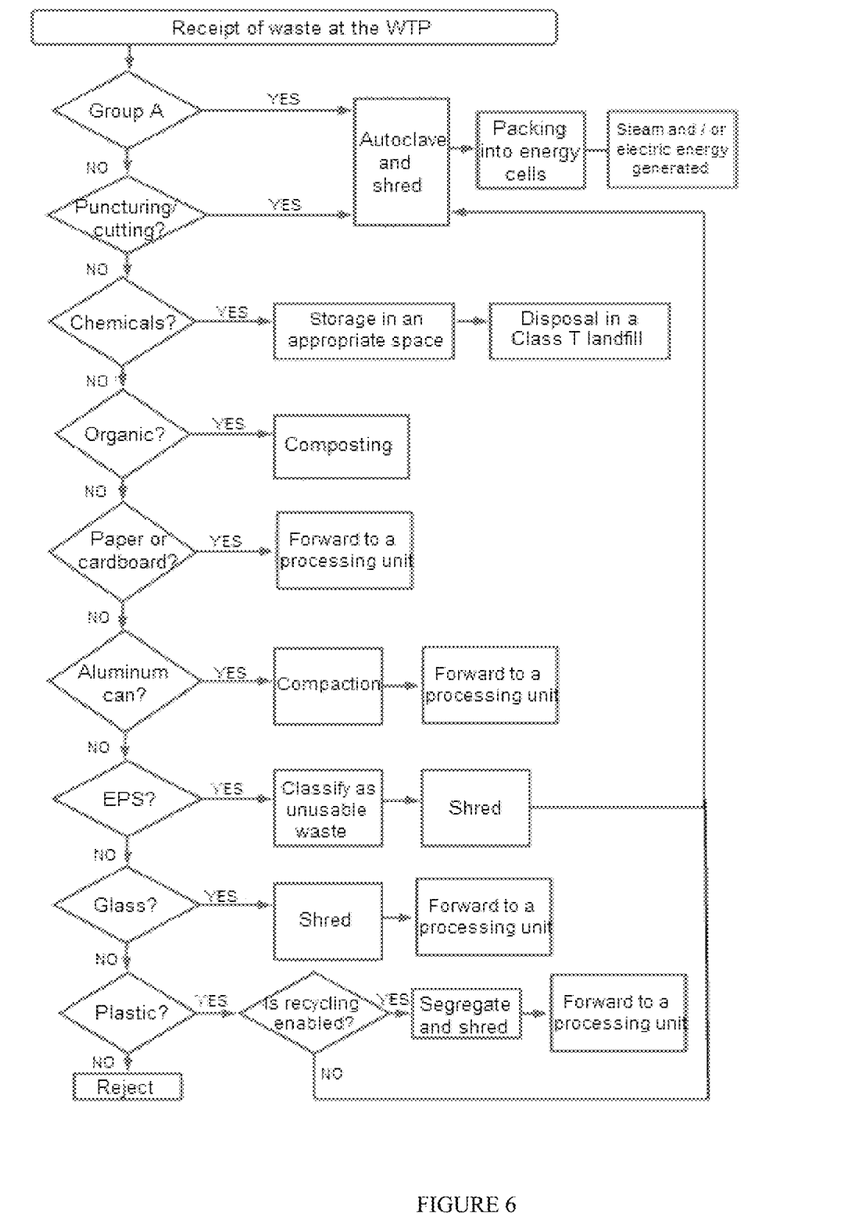
FIG. 6 shows an overall flowchart depicting the treatment of solid waste after arriving at the Waste Transformation Plant.

As shown in FIG. 5, the biological waste and unusable plastics discarded in containers arranged in the generating unit are sent to the WTP where they are packaged, sterilized and crushed, being sent to a dosing silo that forwards the waste for transformation into an energy cell. These energy cells offer several advantages such as a reduction in volume and logistics costs once the waste is compacted, and ease and control in processing for transformation into fuel gas.

Heat treatment of the energy cell produces fuel gas which, when burned, generates steam and electrical energy, used in the facilities of the generating unit, thus reducing consumption from an external supplier.

Additionally, one of the alternatives for application of this invention is to build an external waste transformation plant to which hospitals would be able to send their waste. This waste would be processed and transformed at these WTPS and hospitals, for example, would receive the following items in return: toilet paper and other products produced from paper and cardboard waste; garbage bags and other products produced using plastic waste; organic compost for use in gardening and the planting vegetable gardens produced using organic waste; and energy cells for use as fuel through means of the gasification of infectious waste and unusable plastics.

Using this model, returned products are produced outside the hospital; however, compost and energy cells would be used inside the hospital itself. Alternatively, organic compost may be sent from the STP to a licensed farmer and returned to the hospital in the form of agricultural inputs.

Another alternative for use of this method would be to work together with the suppliers of materials for hospitals, which are subject to environmental liability with regards to the impacts of their products and packaging. Such an operation is carried out through suppliers that install a waste transformation plant within their industrial facilities. Waste from partner hospitals would be received at this plant. Processed waste would be returned to the hospital in the form of recycled products (toilet paper and other products produced using paper and cardboard waste, garbage bags and other products made from plastic waste, and organic compost from organic waste and energy cells). Remaining waste would be used to supply energy at the supplier's industrial unit.

Under an additional variation to this process, a WTP may be constructed through means of a supplier consortium. Waste would be processed at this consortium and the resulting products would be provided under the same logic described above.

The invention claimed is:

1. A method for the management of solid waste from healthcare services, comprising:
   a) collecting and transporting solid waste from a generating unit to a Waste Transformation Plant (WTP) internal or external to the generating unit;
   b) at the WTP, processing waste with the following steps:
      i. the recyclable waste is segregated, processed and packaged and can be sent directly to a processing industry as raw material and not as scrap or trimmings;
      ii. the organic waste is processed by a decomposition acceleration system and transformed into a compound for agricultural use for use by the generating unit itself in its gardens and vegetable plots, closing the complete cycle of this type of waste;
      iii. Biologically contaminated waste is treated, processed and transformed into an energy cell;
   c) the generating unit forwards the waste segregated and processed in the WTP (that is, they are in the format of raw material) to a processing unit specific to its typology (plastics processing industry for plastics, paper processing industries for papers and so on);
   d) each processing unit informs the generating unit of the amount of waste collected;
   e) the plastics processing unit delivers to the generating unit products transformed into plastic articles in an amount equivalent to the amount of waste collected, closing the plastic waste cycle;
   f) the paper processing unit and the like deliver to the generating unit products transformed into paper articles and the like in the amount equivalent to the amount of waste collected closing the cycle of paper waste and the like;
   g) the glass processing unit delivers to the generating unit products transformed into glass articles in the amount equivalent to the amount of waste collected, closing the glass waste cycle;
   h) the aluminum processing unit delivers to the generating unit products transformed into aluminum articles in the amount equivalent to the amount of waste collected, closing the aluminum waste cycle;

i) the tissue processing unit delivers to the generating unit products transformed into tissue articles in an amount equivalent to the amount of waste collected, closing the tissue waste cycle;

j) the WTP delivers to the generating unit the energy cells equivalent to the amount of waste collected for conversion into thermal energy within the generating unit itself, closing the cycle of contaminated waste.

2. The method for the management of solid waste from healthcare services according to claim 1, wherein in step b) the waste from the containers is segregated into categories, such as white paper, cardboard and tetrapack, which are packed in specific packaging and directed to the shipping sector; and paper and cardboard waste that has not been categorized is considered waste or common waste and sent to the compactor to be sent to a landfill.

3. The method for the management of solid waste from healthcare services according to claim 1, wherein in step b) the waste from the containers is segregated into categories, such as a group of polyethylenes, group of PET [poly (ethylene terephthalate)], being crushed and packaged; and the waste classified as biological, unusable or economically unfeasible are sintered to obtain an energy cell and then thermally transformed to decompose their molecules and produce combustible gas for use as an energy source.

4. The method for the management of solid waste from healthcare services according to claim 1, wherein in step a) for the collection of waste paper and cardboard, plastics, glass, organic waste, properly marked containers are arranged.

5. The method for the management of solid waste from healthcare services according to claim 1, wherein in step a) dispose in the places of greater generation of waste paper and cardboard and discarded plastics, mobile structures that are regularly collected for packaging in containers of greater capacity.

6. The method for the management of solid waste from healthcare services according to claim 1, wherein in step b) the discarded glass is separated, crushed and conditioned.

7. The method for the management of solid waste from healthcare services according to claim 1, wherein in step b) organic waste from food and food production leftovers is discarded in containers and sent to be subjected to accelerated composting for transformation into humic substances by the action of microorganisms.

8. The method for the management of solid waste from healthcare services according to claim 1, wherein in step b) the organic waste is sorted for the removal of any plastic packaging that, if possible, to be removed, follows the treatment procedures applied to plastics; if the plastic packaging is not removed from the organic waste, the waste is classified as common waste and is packed in packaging suitable for landfill.

9. The method for the management of solid waste from healthcare services according to claim 1, wherein in step b) biological waste and unserviceable plastics are packaged, sterilized and crushed, being sent to a dosing silo that directs the waste for transformation into an energy cell.

* * * * *